Jan. 12, 1960

F. E. HOFFLER 2,920,680

APPARATUS FOR MANUFACTURING LAMINATED
FURRING NAIL SPACERS

Filed March 25, 1957

INVENTOR.
FRED HOFFLER
BY
Fleh & Swain
ATTORNEYS

Jan. 12, 1960  F. E. HOFFLER  2,920,680
APPARATUS FOR MANUFACTURING LAMINATED
FURRING NAIL SPACERS
Filed March 25, 1957  4 Sheets-Sheet 3

INVENTOR.
FRED HOFFLER
BY
Fleke & Swain
ATTORNEYS

INVENTOR.
FRED HOFFLER
BY
Flehr & Swain
ATTORNEYS

United States Patent Office 2,920,680
Patented Jan. 12, 1960

2,920,680

APPARATUS FOR MANUFACTURING LAMINATED FURRING NAIL SPACERS

Fred E. Hoffler, Nevada City, Calif.

Application March 25, 1957, Serial No. 648,155

7 Claims. (Cl. 154—1)

This invention is an apparatus for manufacturing laminated furring nail spacers and particularly to apparatus of this kind for manufacturing said spacers from a single sheet to form a plurality of laminations of relatively heavy asphalt impregnated felt or paper.

It has heretofore been the practice, as I understand it, to manufacture spacers for furring nails by punching them directly from asphalt impregnated felt or paper and to cause a number of them to be positioned immediately adjacent one another and securing them together. They have previously been secured by gluing them together or by holding them in a predetermined position and driving a nail through them with the result that the frictional engagement between the nail and the laminations has served to hold the entire assembly together until its ultimate use.

The general object of this invention is to provide improved apparatus for manufacturing laminated members usable for furring nail spacers and particularly to provide for the elimination of unnecessary waste of the source material during the formation of such spacers with the resultant decrease in cost of the finished product. This result is accomplished by punching a plurality of laminates from a relatively thin piece of material and then gluing them together with an appropriate adhesive. The general method of producing such laminated furring nail spacers is suggested in Parker Patent 2,618,311, granted November 18, 1952, wherein a number of pieces of appropriate diameter are cut from a thin web of material and are glued together. The principle of the Parker patent is that before the disks are cut from a web of material, a dot of glue is positioned on those disks which are to be secured together, while certain disks are not glued with the result that four or five successive laminates are caused to adhere together while the fifth and sixth laminates are not caused to adhere. In this manner Parker has produced a series of five, for example, laminates which are glued together to form a single furring spacer but the fifth and sixth will not be glued together with the result that a completed spacer is thus produced. Moreover the Parker apparatus, in order to ensure that the devices will remain glued, has required that the laminates be held in compressed position for a substantial period of time and the Parker patent specifies and discloses that the pile of laminates should preferably be held in a split tube with the result that the Parker mechanism is unduly complex and requires that a substantial number of the laminates be held in the tubes at all times. The frictional engagement between the laminates and the side walls of the tube naturally increase the pressure required for further punching by the Parker device with the result that a punch press of considerable capacity is required.

Moreover the utilization of the Parker device which has required eliminating the application of glue to certain laminates presents a particular timing problem and the change from an assembly consisting of five to a spacer assembly consisting of seven laminates, for example, is rendered difficult.

It is an object of this invention to provide a device for the manufacture of laminated furring nail spacers which eliminates the difficulties imposed upon the manufacturer of these spacers by the Parker device.

The above and other objects and advantages of the invention will be better understood from the following detailed description of the typical embodiments illustrated in the accompanying drawings in which:

Figure 6 is a perspective view of the stripping device illustrated in Figure 4.

Figure 1:
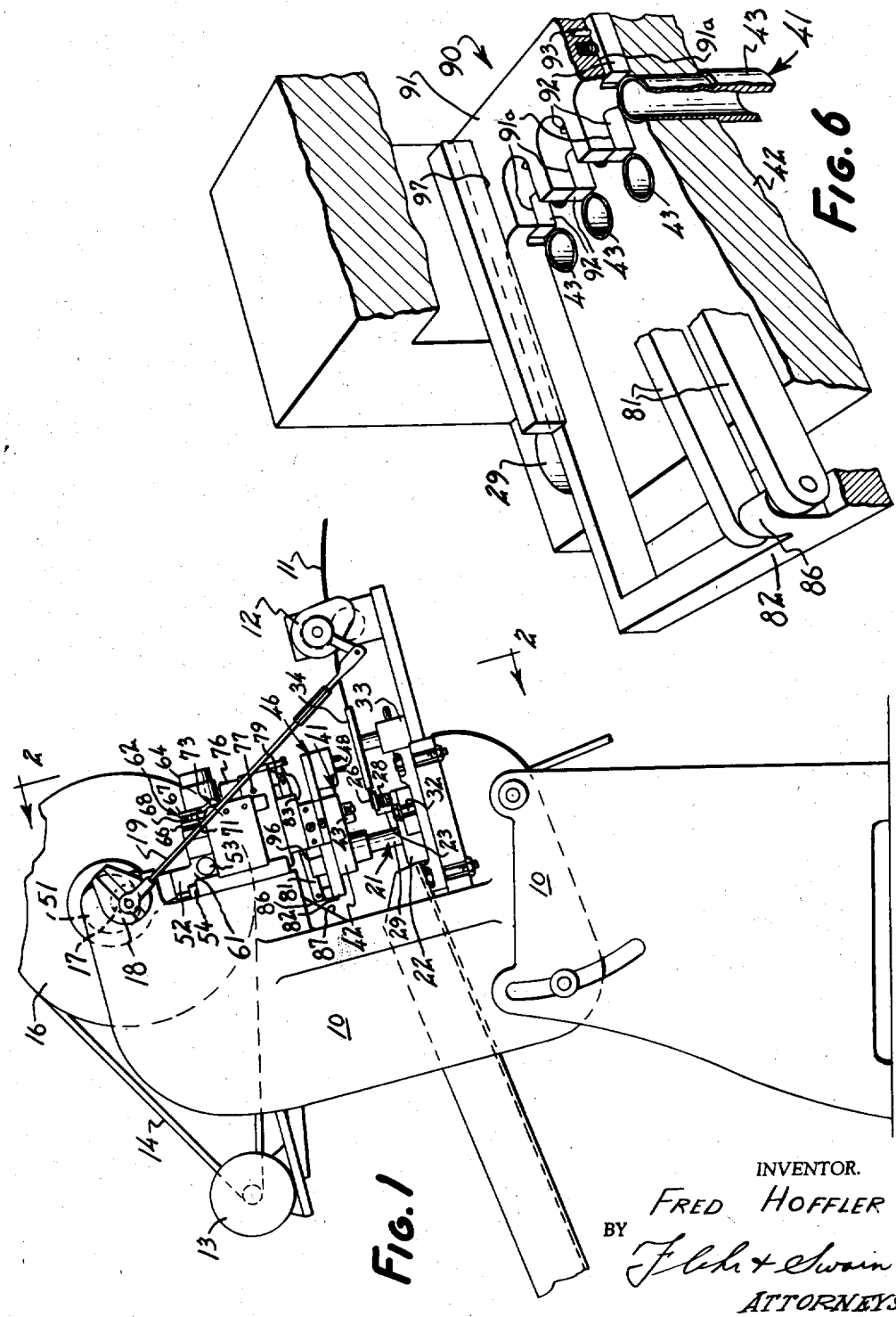
Figure 1 represents a side elevational view of my machine for forming laminated spacer disks for furring nails.

As viewed particularly in Figure 1 my device is adapted to be mounted upon a substantially conventional punch press 10 into which a web of material 11 is fed from a suitable supply roll, not shown, by means of an intermittent feed mechanism 12. The web of material 11 is formed of any suitable material and may consist of ordinary tar paper or asphalt impregnated felt or other material demanded by the user of the nails.

The punch press 10 is adapted to be actuated by a motor 13 through a belt drive 14 and a fly wheel 16. The fly wheel 16 operates (through a counter shaft 17, see Figure 2) an eccentric 18 which through shaft 19 operates the intermittent advance device 12. The amount of advance is adjusted through the connection between the shaft 19 and the eccentric 18 in a well known manner.

The punch press 10 is conventional to the extent that it is adapted to support male and female dies and actuate them with respect to each other to punch disks from the web of material 11 which is intermittently advanced between the male and female portions of the die. As the disks are punched from the web they are retained in the female portion of the die for a period of time and are then extended upwardly above the upper surface of the female portion until they are stripped therefrom by the intermittent operation of a stripper. I have provided a reciprocating glue pot member, which reciprocates with the female die and which puts dots of glue at predetermined points on the advancing web in such a manner that the glue dots will register with the center of the disk which is ultimately punched from the web. Each disk is provided with a dot of glue with the result that all of the disks punched will be glued together. The elongated pile of laminations is cut by the action of the stripper to provide spacers of predetermined thicknesses.

With this brief explanation of the mode of operation of my device I will advance to a more complete description of the device which I provide for carrying it out.

The punch press assembly 10 supports a male die assembly 21 and a female die assembly 41.

Figure 2:
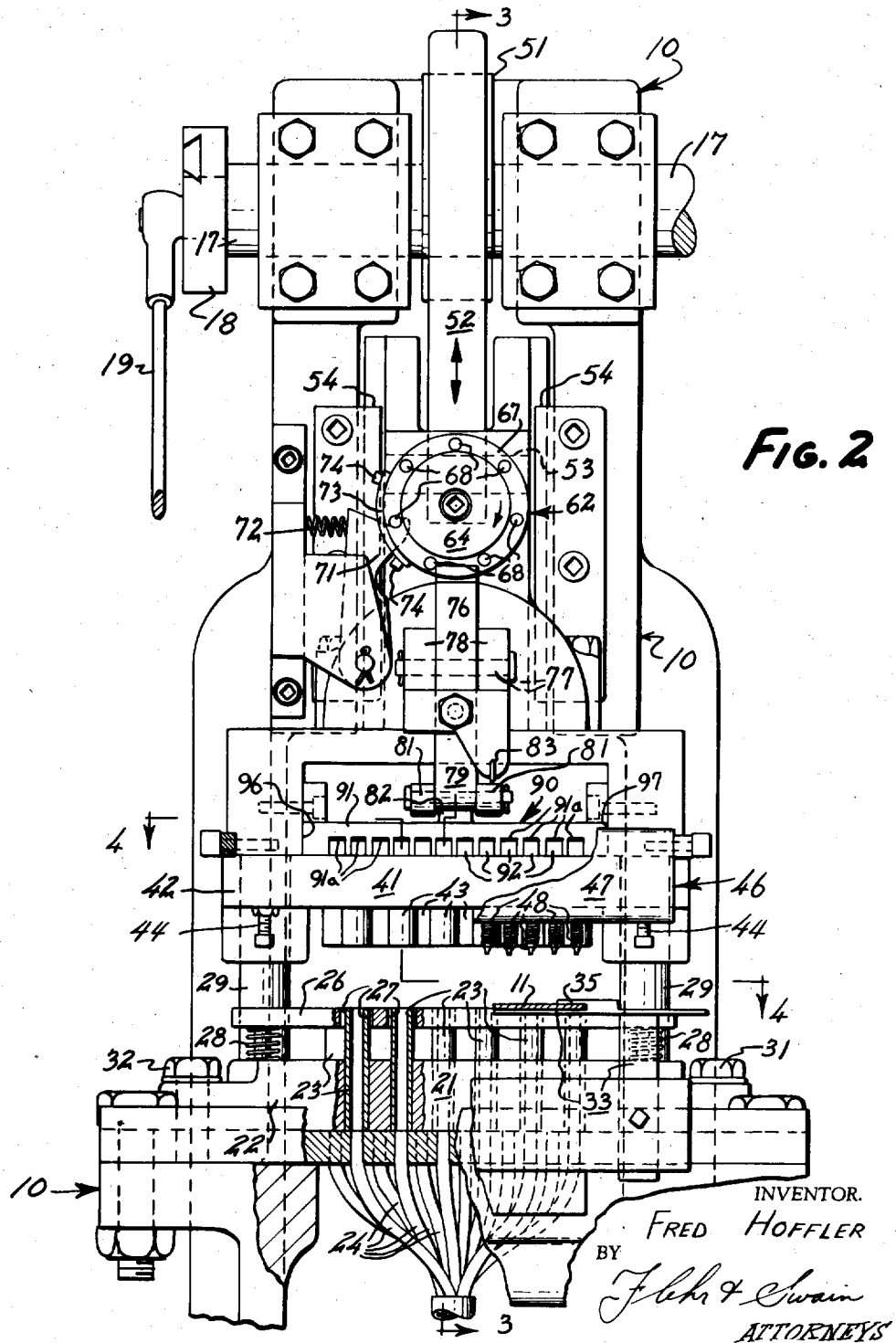
Figure 2 is an enlarged front view of the device illustrated in Figure 1, partially in cross-section.
Figure 3:
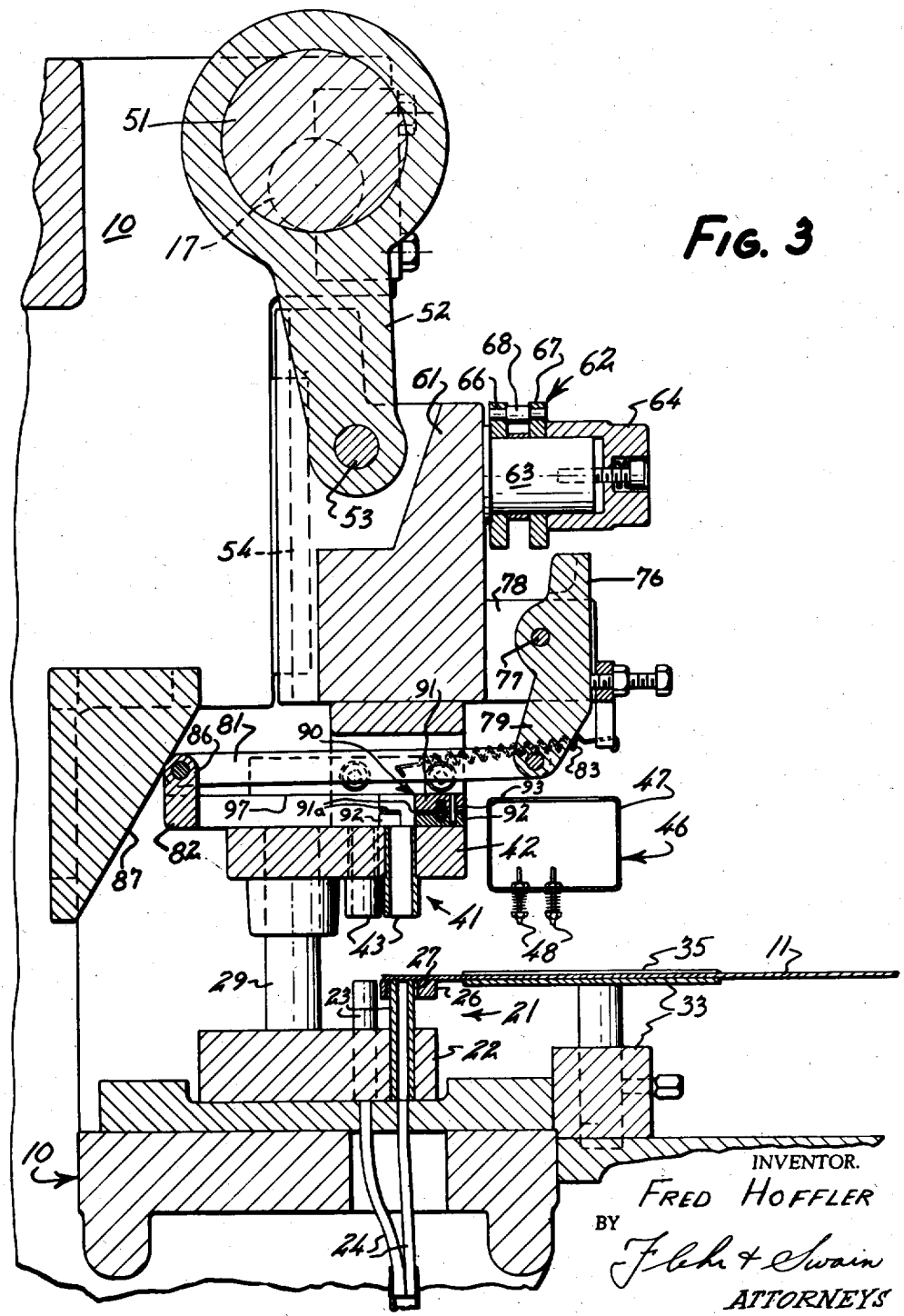
Figure 3 is a cross-sectional view taken along the line 3—3 of Figure 2.
Figure 5:
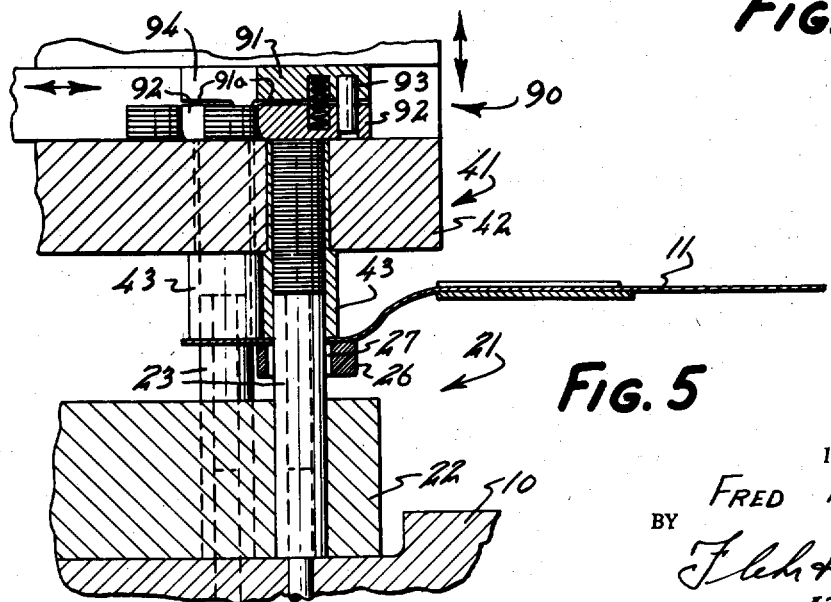
Figure 5 is an enlarged detail view taken along the line 5—5 of Figure 4.

As viewed particularly in Figures 2, 3, and 5, the male die assembly 21 consists of a base plate 22 which is drilled to receive a plurality of tubular members 23 which are secured thereto in any suitable manner and which are hollow to provide for the passage of air which is fed thereto through a plurality of air conduits 24. The purpose of these conduits will be more fully hereinafter described. The tubular members 23 extend a predetermined distance above the top surface of the base plate 22. The base plate 22 also supports a transverse plate 26 which is provided with a plurality of orifices 27 through which the die tubes 23 extend. The plate 26 is mounted upon guide pins and is spaced from the plate 22 by a plurality of coil springs 28 which normally hold the plate 26 in such a position that its upper surface and the supper ends of the tubes 27 are coplanar.

The base plate 21 also provides a suitable mounting for a pair of guide members 29 upon which the female die assembly 41 is adapted to reciprocate in a vertical manner.

The base plate 22 and those portions of the assembly connected therewith which have previously been described are adapted to be secured to the punch press 10 in any suitable manner and as by means of bolts 31 and 32.

The press 10 also supports, immediately adjacent to the male punch assembly 21, a table support 33 which is adjustable with respect to the entire device and which provides a guide-way and a table to support the advancing web of material. The table 33 is provided with side guides 34 and 35 which prevent transverse movement of the web and confine its movement in a longitudinal path as determined by the advancing mechanism 12. However the table 33 forms a support for the web 11 as dots of glue are applied thereto in the manner which will more fully hereinafter be explained.

Figure 4:
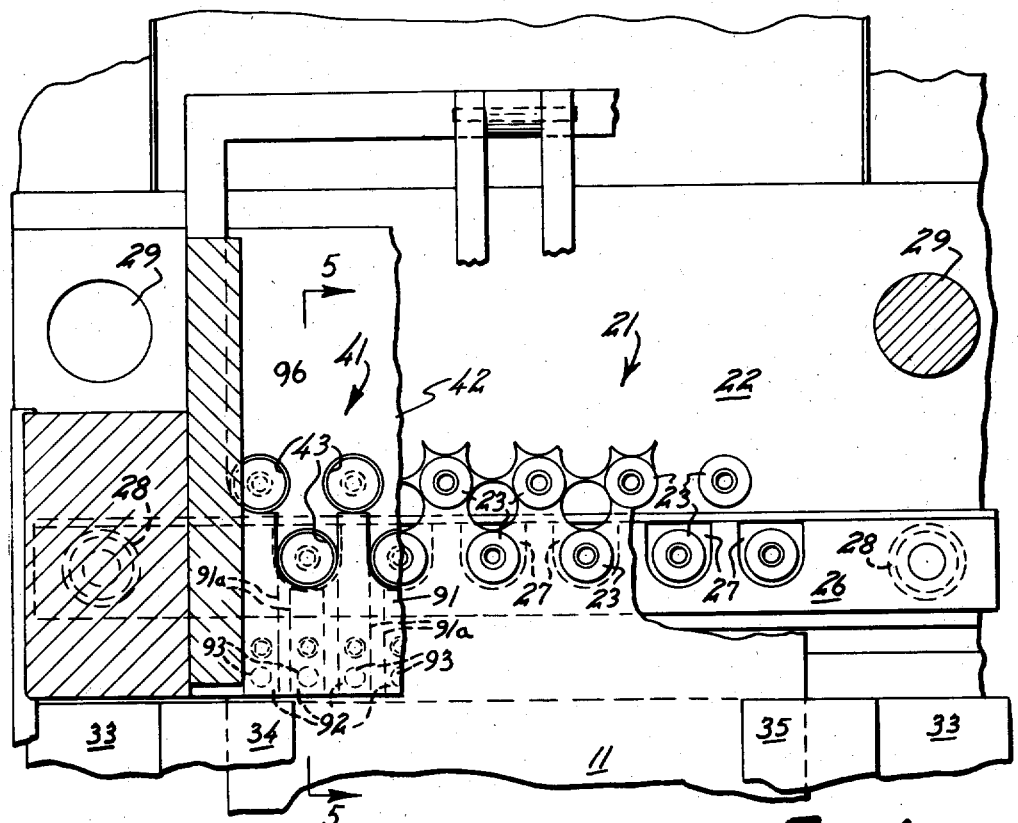
Figure 4 is a cross-sectional detail view taken along the line 4—4 of Figure 2.

The female portion 41 of the die assembly is perhaps best illustraated in Figures 2, 3 and 4 and consists of a block 42 which is provided with a plurality of tubular female die members 43 which extend downwardly a predetermined distance from the lower face of the block 42. The members 43 of the female assembly and the tubular members 23 of the male assembly are in registry so that when the dies are reciprocated the male die penetrates the female die. The inner diameter of the female die is substantially identical with the outside diameter of the male die. As has previously been pointed out, the female die assembly 41 is adapted to reciprocaate upon the guide pins 29. As the press reciprocates, the female die tube members 43 first engage the web of material 11. The pins 44 then engage the upper surface of the plate 26 and urge the same downwardly. Simultaneously therewith the female die members 43, which have by this time engaged the material 11 will tend to urge the member 26 and the web of material downwardly over the male dies 23 with the result that a small disk will be cut from the web 11. Further downward movement of the female die assembly 41 will urge the newly cut disk (and other disks) upwardly through the hollow center of the member 43. Retraction of the female member will serve to remove the member 23 and allow plate 26 to lift material 11 above the male dies thus avoiding crumpling of material when advanced.

The female die assembly 41 is actuated by the shaft 17 which is provided with a cam 51 as illustrated in Figure 2, which, through a connecting rod 52 and a pivotal connection assembly 53 serves to cause its reciprocation. Suitable guideway assemblies indicated at 54 in Figure 3 are provided so that the female assembly reciprocates along a predetermined path.

As indicated generally at Figure 3 the female die assembly 41 also supports a glue pot assembly 46 which consists of a glue pot 47 and a plurality of glue applicating members 48 of the type illustrated in the Forslund Patent No. 2,753,836 dated July 10, 1956. The glue pot assembly 46 reciprocates with the female die assembly 41 and as the two go down the glue applicating members 48 engage the web 11 and place a predetermined quantity of glue upon the web at predetermined points. The device is adjusted in such a manner that the points to which the glue is applied will ultimately be advanced to a position between the die assemblies 21 and 41 and those points will be the centers of the disks of material which are cut from the web 11.

Operation of those portions of the machine described to this point may be set forth as follows. A web of material 11 is passed through the intermittent advancing mechanism 12 and between the side guides 34 and 35 of the table 33 into a position between the die assemblies 21 and 41. The machine is actuated with the result that the material will be advanced by the intermittent advancing mechanism 12 and the female die assembly will be reciprocated as will the glue pot assembly 46. As the assembly 46 is reciprocaated dots of glue will be deposited upon the web of material at predetermined points. As the female die assembly 41 is reciprocated, disks of a predetermined size will be cut from the advancing web and will be urged into intimate contact with each other in the female portion of the die and particularly within the tubes 43. The continued reciprocation of the female die assembly 41 will pound the disks into engagement with each other and will cause the glue to cause adjacent disks to adhere to each other.

To this extent the punch press and die assemblies which are described are substantially conventional.

It is apparent that as the stack of glued laminates increases in height they will extend upwardly through the upper surface of the die plate 41 and that such a collection of laminates would serve no useful purpose. It is necessary therefore that these stacks of laminates be cut off at predetermined points to provide furring wads of a predetermined thickness. The mechanism for performing this function will now be described.

I have provided upon the front surface of the reciprocating portion 61 of the punch press assembly, a rotatable indexing member 62. The rotatable member 62 which is mounted upon an axle 63 and is held thereon by means of a suitable assembly 64. The member 62 is provided with a pair of radially extending flanges 66 and 67, which, between them, support a plurality of cross members 68, which in effect, form ratchet teeth. I have provided a spring urged pawl member 71 which is normally urged into engagement with the member 62 by means of a spring 72. Thus, as the assembly 61 reciprocates, the pawl 71 engages the teeth 68 serving to turn the member 62 in a clockwise direction as viewed in Figure 2. The periphery of the member 62 supports a cam member 73 which is secured thereto by means of the bolts 74. Thus it will be seen that as the member 61 is reciprocated, the member 62 will likewise be reciprocated and will also be advanced by pawl 71 which does not reciprocate. The degree of advance, of course, depends upon the number and positioning of the cross members 68. However let it be assumed that one complete rotation of the member 62 is accomplished upon six cycles of reciprocation of member 61. The cam 73 is adapted to engage a lever arm 76 which is pivotally mounted at 77 between a pair of extending side arms 78 on the member 61. The operation of the lever 76 serves to actuate the stripping assembly 90 through the portion 79, the levers 81 and the yoke 82, which, as viewed particularly in Figure 4 is connected to the stripping or cut-off assembly 90. A spring 83 normally urges the stripper assembly 90 to the position illustrated generally in Figure 3. The connection between the yoke 82 and the levers 81 is perhaps best illustrated in Figure 3. The boss 86 is adapted to engage a sloping surface 87 formed on the frame of the machine 10. The purpose of this engagement will more fully hereinafter be set forth.

The stripping assembly 90 consists, in general, of a transverse plate 91 having in its bottom surface a plurality of parallel grooves 91a, which are equally spaced on center lines of dies 43. Grooves 91a lie along path of reciprocation of plate 91 and are positioned apart to accommodate a stack of laminates. A spring depressed stripper finger 92 is confined in each groove 91a by a dowel 93. Assembly 90 rests on upper surface of plate 42 and reciprocates with guideways 96 and 97 as indicated in Figure 2. When the stripper assembly 90 is caused to reciprocate, the advancing vertical surfaces of the fingers 92 engage the stacks of laminates which extend above the upper surface of the guide plate 42 and serve to strip them from those laminates which are below that surface. The advancing edges are chamfered as shown in Figure 5. It will be observed, particularly from a view of Figure 1, that the upper surface of the guide block 42 is sloping and the groups of laminates slide to the rear by gravity.

Operation of this assembly may briefly be described as follows: As the punch press reciprocates, the member 61, which is a part thereof, likewise reciprocates as a unit with the female die assembly 41 and the glue pot assembly 46. The indexing member 62 likewise reciprocates and since it engages the spring urged pawl 71, which is fixed against vertical movement, the member 62 will be rotated. Rotation of the member 62 likewise causes rotation of the cam 73. As the cam 73 engages the arm 76, stripping assembly 90 is reciprocated. The device is timed in such a manner that the stripping assembly 90 is caused to reciprocate after the female die has completed its downward stroke. In this manner the stripper fingers will not occupy positions overlying the open upper ends of the female dies during a punching operation. Upward movement of the entire assembly is accomplished in the manner previously described. The spring 83 will normally return the entire assembly to the position illustrated generally in Figure 3. However in the event the spring breaks or fails to function for some reason, as the entire assembly is urged upwardly, the boss 86 will engage the slanted surface 87 and the camming action of that engagement will urge the stripping assembly 90 to that position regardless of the spring 83.

It will be seen from the foregoing therefore that I have provided stripping means and means for actuating the same in predetermined timed relationship with the remainder of the machine whereby each of the laminates may be glued together and yet a series of laminations of a particular number or a laminated assembly of a particular thickness may be provided with simple adjustment of the cam 73 or changing the number of cross members 68.

Certain other advantages are provided by me, as, for example, I have provided a means for removing excess paper and for keeping the dies clean by introducing air under pressure into the male dies through the air inlet tubes 24.

I claim:

1. In apparatus for forming laminated furring nail spacers, a punching mechanism for successively punching a plurality of similarly-shaped flat elements from a sheet of material, means operable in a predetermined timed relationship with the punching mechanism to intermittently advance said material through the punching mechanism, an adhesive applying mechanism operable in a predetermined timed relationship with the means for advancing the material to apply adhesive to the portions of the material from which the elements are punched, means for retaining the elements in a stacked relationship after they are punched so that the adhesive forms the elements into a laminated member, and means for periodically stripping a plurality of elements as a furring nail spacer from said laminated member, said last named means operating in a timed relationship with the punching mechanism.

2. In apparatus for forming laminated furring nail spacers, a punching mechanism for successively punching a plurality of similarly spaced flat elements from a sheet of material, means operable in a predetermined timed relationship with the punching mechanism to intermittently advance said material through the punching mechanism, and adhesive applying mechanism operable in a predetermined timed relationship with the means for advancing the material to apply adhesive to the portions of the material from which the elements are punched, the punching mechanism including male and female dies, the female die being in the form of a hollow member and through which the elements are directed in a stacked relationship after they are punched so that the adhesive forms the elements into a laminated member, and means for periodically stripping from the laminated member the portion of the laminated member extending out of the hollow member at periodic intervals in a predetermined timed relationship with the punching mechanism.

3. Apparatus as in claim 2 wherein the female die is disposed above the male die and in which the elements are directed upwardly into the female die.

4. Apparatus as in claim 2 wherein said means for periodically stripping includes a stripping member, and means for reciprocating said stripping member, said last named means including a cam member actuated by operation of the punching mechanism.

5. Apparatus as in claim 2 wherein said means for periodically stripping includes a rotatable indexing member, means for advancing said indexing member step by step as the punching mechanism is operated, a cam member carried by the indexing member, a stripping member, and means connected to said stripping member adapted to be engaged by said cam member whereby upon rotation of said indexing member to a predetermined position said member will cause operation of said stripping member.

6. In apparatus for forming laminated furring nail spacers, a punching mechanism for successively punching a plurality of similarly shaped flat elements from a sheet of material, means operable in a predetermined timed relationship with the punching mechanism to intermittently advance said material through the punching mechanism, an adhesive applying mechanism operable in a predetermined timed relationship with the means for advancing the material to apply adhesive to the portions of the material from which the elements are punched, means for retaining the elements in a stacked relationship after they are punched so that the adhesive forms the elements into a laminated member, and means for periodically stripping a plurality of elements from said laminated member operating in a predetermined timed relationship with the punching mechanism, said last named means including a stripping member, movable between two positions, means including a cam member actuated by operation of the punching mechanism for moving said stripping member from one position to the other position to strip the elements from the laminated member, and yieldable means for returning the stripping member to its first named position after the stripping operation.

7. Apparatus as in claim 6 together with additional means for returning said stripping member to its first position in the event of failure of said yieldable means.

References Cited in the file of this patent

UNITED STATES PATENTS

| | | |
|---|---|---|
| 381,716 | Murray | Apr. 24, 1888 |
| 1,865,947 | Novick | July 9, 1932 |
| 1,941,016 | Mayle | Dec. 26, 1933 |
| 2,325,290 | Wales | July 27, 1943 |
| 2,618,311 | Parker | Nov. 18, 1952 |